US012635609B2

(12) United States Patent
Malkowich et al.

(10) Patent No.: US 12,635,609 B2
(45) Date of Patent: May 26, 2026

(54) DRAPER HEADER WITH AUTOMATIC REEL TO CUTTER BAR CLEARANCE

(71) Applicant: MACDON INDUSTRIES LTD., Winnipeg (CA)

(72) Inventors: Garrett Malkowich, Winnipeg (CA); Bruce Robert Shearer, Winnipeg (CA); James Thomas Dunn, Winnipeg (CA)

(73) Assignee: MACDON INDUSTRIES LTD., Winnipeg (CA)

( * ) Notice: Subject to any disclaimer, the term of this patent is extended or adjusted under 35 U.S.C. 154(b) by 463 days.

(21) Appl. No.: 18/032,310

(22) PCT Filed: Oct. 18, 2021

(86) PCT No.: PCT/CA2021/051459
§ 371 (c)(1),
(2) Date: Apr. 17, 2023

(87) PCT Pub. No.: WO2022/077122
PCT Pub. Date: Apr. 21, 2022

(65) Prior Publication Data
US 2023/0397537 A1 Dec. 14, 2023

Related U.S. Application Data

(60) Provisional application No. 63/092,523, filed on Oct. 16, 2020.

(51) Int. Cl.
*A01D 57/04* (2006.01)
*A01D 34/28* (2006.01)

(52) U.S. Cl.
CPC .......... *A01D 57/04* (2013.01); *A01D 34/286* (2013.01)

(58) Field of Classification Search
CPC .... A01B 63/002; A01D 34/28; A01D 34/283; A01D 34/286; A01D 41/141; A01D 41/06; A01D 57/00; A01D 57/02; A01D 57/04
See application file for complete search history.

(56) References Cited

U.S. PATENT DOCUMENTS 4,124,970 A * 11/1978 Bernhardt .............. A01D 57/04
56/DIG. 15
4,204,383 A * 5/1980 Milliken, Jr. .......... A01D 57/00
56/DIG. 15

(Continued)

*Primary Examiner* — Adam J Behrens
(74) *Attorney, Agent, or Firm* — Miller Canfield

(57) ABSTRACT

A draper header for harvesting crops includes a header frame with a middle frame section pivotally coupled between a pair of side wing sections. A cutter bar assembly extends across a front portion of the header frame and is flexible with the side wing sections for cutting the crops to be harvested. A pair of crop pick-up reels are rotatably supported by center and outer reel support arms for engaging the crops to be harvested. A sensing system is operatively coupled to the header frame for detecting when at least one of the side wing sections pivots downwardly relative to the middle frame section. When the sensing system detects that at least one of the side wing sections pivots downwardly past a predetermined pivot angle, a down-stop cylinder is actuated to raise the crop pick-up reels, thereby preventing contact of the crop pick-up reels with the cutter bar assembly.

22 Claims, 12 Drawing Sheets

(56)                    References Cited

U.S. PATENT DOCUMENTS

| | | | | |
|---|---|---|---|---|
| 5,350,020 | A * | 9/1994 | Vandever | A01D 31/02 |
| | | | | 56/2 |
| 5,752,372 | A * | 5/1998 | Buermann | A01D 57/04 |
| | | | | 56/130 |
| 7,426,817 | B2 * | 9/2008 | Coers | A01D 57/02 |
| | | | | 56/14.4 |
| 7,805,921 | B2 * | 10/2010 | Coers | A01D 41/141 |
| | | | | 56/364 |
| 9,763,385 | B2 * | 9/2017 | Digman | A01D 41/141 |
| 10,034,428 | B2 * | 7/2018 | Cook | A01D 57/04 |
| 11,337,371 | B2 * | 5/2022 | Hunt | A01D 41/127 |
| 12,058,959 | B2 * | 8/2024 | Kemmerer | A01D 41/144 |
| 2009/0107094 | A1 * | 4/2009 | Bich | A01D 41/141 |
| | | | | 56/10.2 E |
| 2015/0216123 | A1 * | 8/2015 | Digman | A01D 41/141 |
| | | | | 56/14.9 |
| 2018/0092305 | A1 * | 4/2018 | Cook | A01D 57/025 |
| 2019/0082603 | A1 * | 3/2019 | Farley | A01D 61/02 |
| 2021/0105944 | A1 * | 4/2021 | Sudhues | A01D 41/148 |

* cited by examiner

DRAPER HEADER WITH AUTOMATIC REEL TO CUTTER BAR CLEARANCE

CROSS-REFERENCE TO RELATED APPLICATIONS

This application claims priority to and all the benefits of U.S. Provisional Application 63/092,523, filed on Oct. 16, 2020, the disclosure of which is hereby incorporated by reference in its entirety.

BACKGROUND OF THE INVENTION

1. Field of the Invention

The present invention relates to a draper header for harvesting agricultural crops.

2. Description of Related Art

Draper headers for use in a field to harvest agricultural crops are known in the art. Typical draper headers include a header frame with side wing sections that pivot upwardly and downwardly relative to a middle frame section to contour to the field as the draper header is moved across the field for harvesting crops. A cutter bar assembly operatively extends across a front portion of the header frame and is flexible with the side wing sections of the header frame for cutting the crops to be harvested. Draper headers known in the art typically also include at least one crop pick-up reel operatively coupled to the header frame for engaging the crops to be harvested. It is advantageous for the crop pick-up reel to be positioned close to the cutter bar assembly for optimal harvesting efficiency. However, when positioned close to the cutter bar assembly, the crop pick-up reel can inadvertently contact the cutter bar assembly when the side wing sections of the header frame pivot relative to the middle frame section in response to terrain changes in the field. Therefore, typical draper headers will often include additional crop pick-up reels or will limit pivoting of the side wing sections, which results in a potentially heavier, costlier, and less efficient product.

SUMMARY OF THE INVENTION

According to one aspect of the invention, a draper header is provided for use in a field to harvest agricultural crops. The draper header includes a header frame with a front portion and a rear portion each extending laterally between opposite ends thereof, and the header frame is divided into a plurality of header frame sections pivotable upwardly and downwardly relative to each other for contouring to the field. A cutter bar assembly extends between the opposite ends of the header frame and is flexible with the plurality of header frame sections for cutting the crops to be harvested. The draper header further includes a plurality of reel support arms pivotally coupled to the rear portion of the header frame and extending above the front portion of the header frame, and at least one crop pick-up reel is rotatably supported by the plurality of reel support arms and positioned generally above the cutter bar assembly for engaging the crops to be harvested. A wing sensing system is operatively coupled to the header frame for sensing pivoting of the plurality of header frame sections relative to each other, and a hydraulic system is adapted for raising and lowering the plurality of reel support arms. The hydraulic system is actuated to raise the at least one crop pick-up reel when the sensing system detects that one of the plurality of header frame sections pivots downwardly relative to another of the plurality of header frame sections for preventing contact of the at least one crop pick-up reel with the cutter bar assembly.

BRIEF DESCRIPTION OF THE DRAWINGS

Advantages of the present disclosure will be readily appreciated as the same becomes better understood by reference to the following detailed description when considered in connection with the accompanying drawings, wherein.

DETAILED DESCRIPTION OF THE EMBODIMENTS

Figure 1:
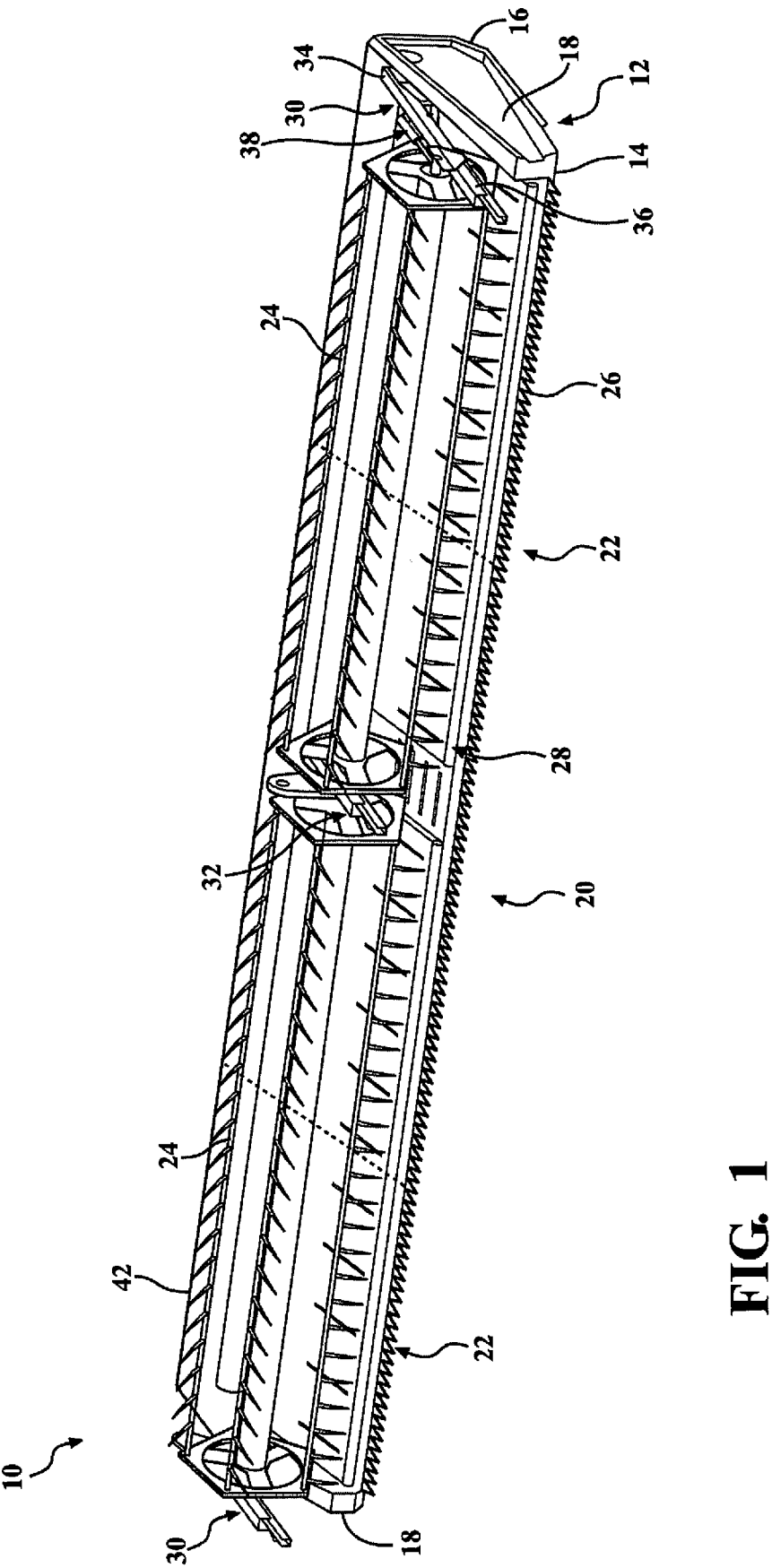
FIG. 1 is a perspective view of a draper header according to a primary embodiment of the present invention.
Figures 2, 2A:
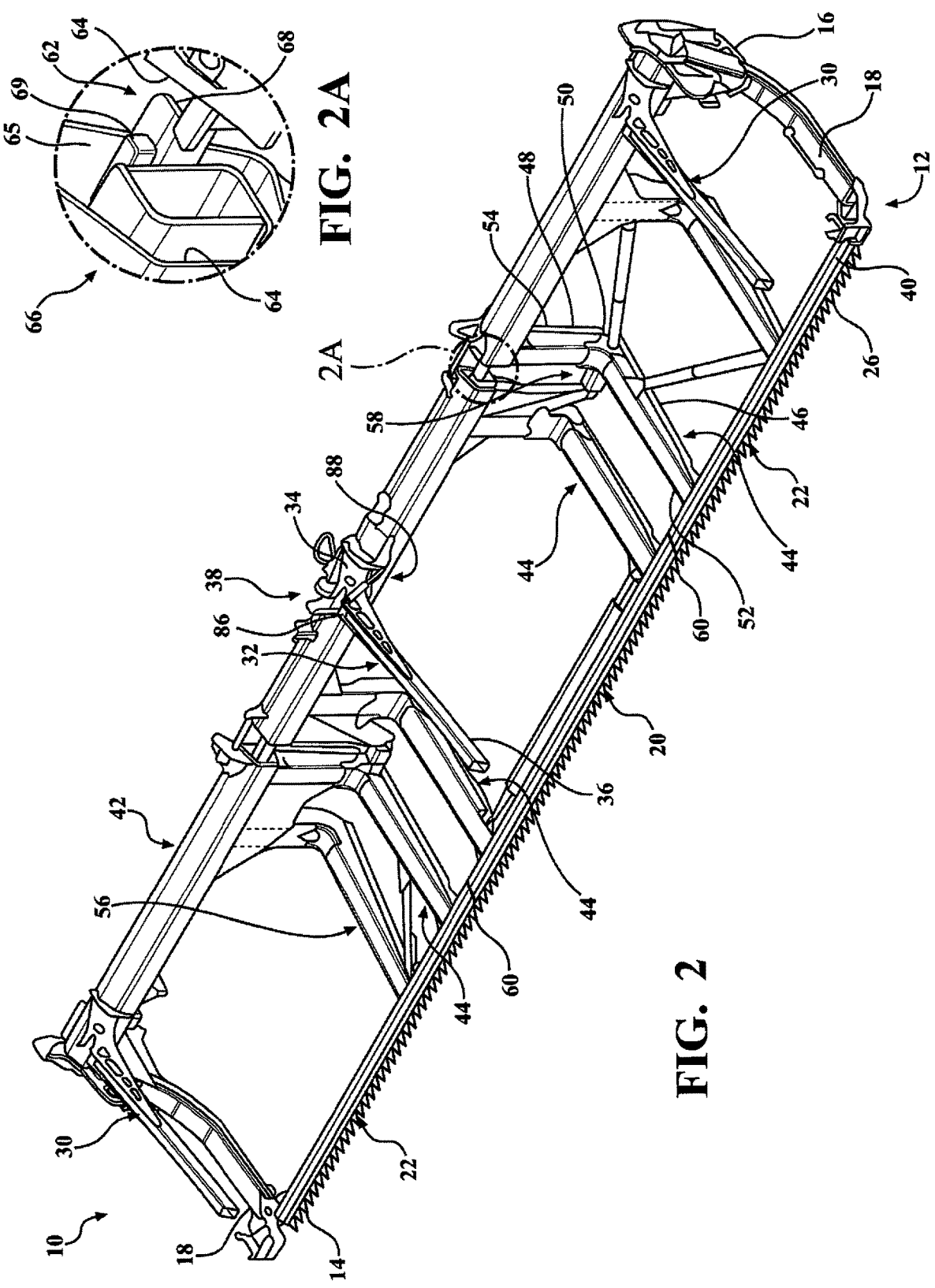
FIG. 2 is a fragmentary perspective view of a header frame of the draper header of FIG. 1 omitting the crop pick-up reels.
FIG. 2A is an enlarged fragmentary perspective view of the header frame of the draper header of FIG. 1 taken from the indicated area in FIG. 2.
Figure 3:
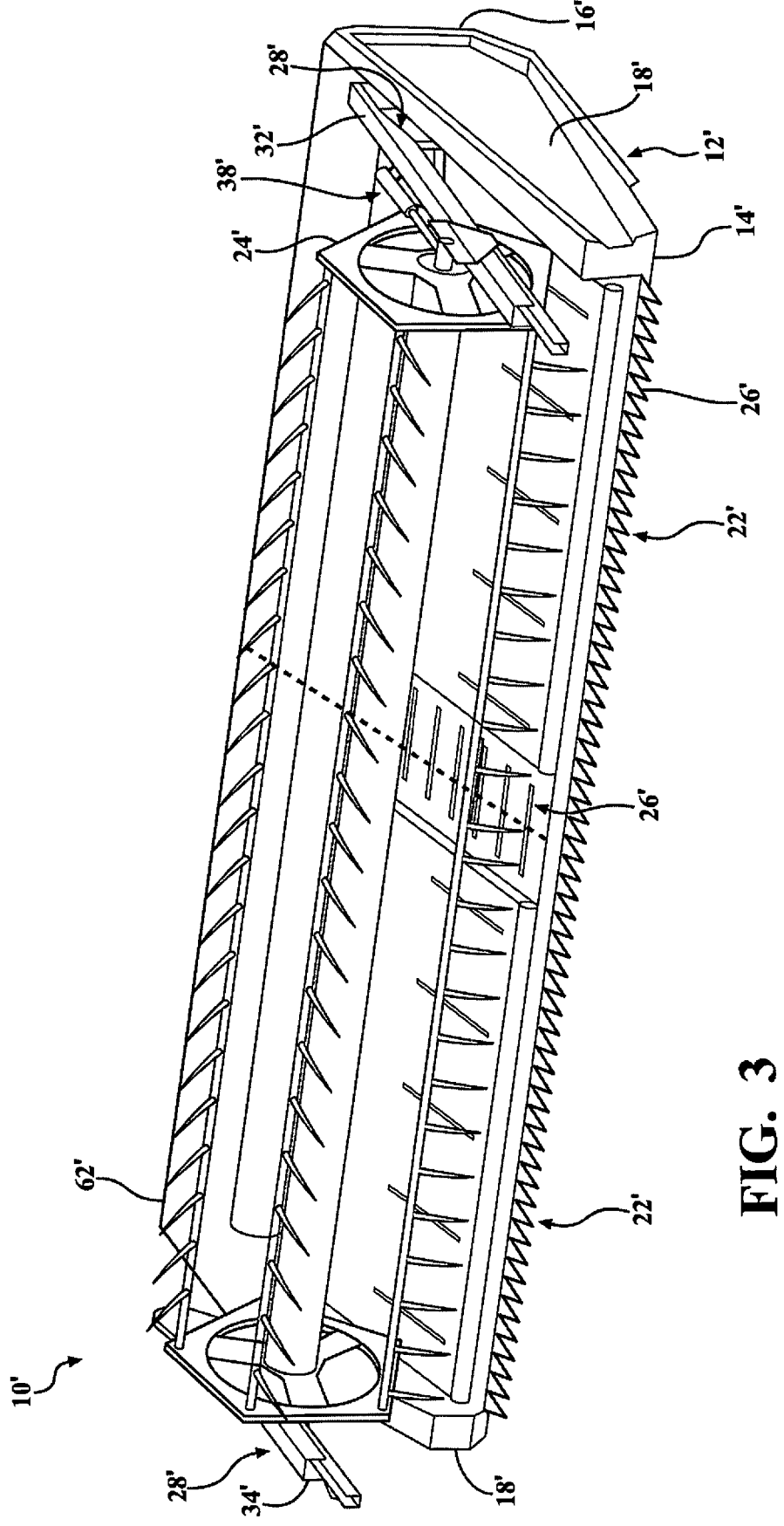
FIG. 3 is a perspective view of a draper header according to an alternative embodiment of the present invention.

Referring to the Figures, wherein like numerals indicate like or corresponding parts throughout the several views, a draper header for harvesting agricultural crops is shown generally at 10. As is known in the art, the draper header 10 is mounted on an agricultural machine, such as a combine or a swather, and travels with the agricultural machine through a field containing the crops to be harvested. The draper header 10 includes a header frame 12 with a front portion 14 and a rear portion 16 each extending laterally between opposite ends 18. The header frame 12 is divided into a middle frame section 20 pivotally coupled between a pair of side wing sections 22, as shown in FIGS. 1 and 2. The side wing sections 22 are pivotable upwardly and downwardly relative to the middle frame section 20 to contour to the field as the draper header 10 is moved across the field for harvesting the crops. Alternatively, depending on the overall size and intended use of the draper header 10, the header frame 12 may include any other suitable number of sections without varying the scope of the invention. One such example of an alternative embodiment of the draper header 10' is shown in FIG. 3, wherein like elements include like element numbers and, as the elements are substantially similar, will not be further explained herein.

Figure 4:
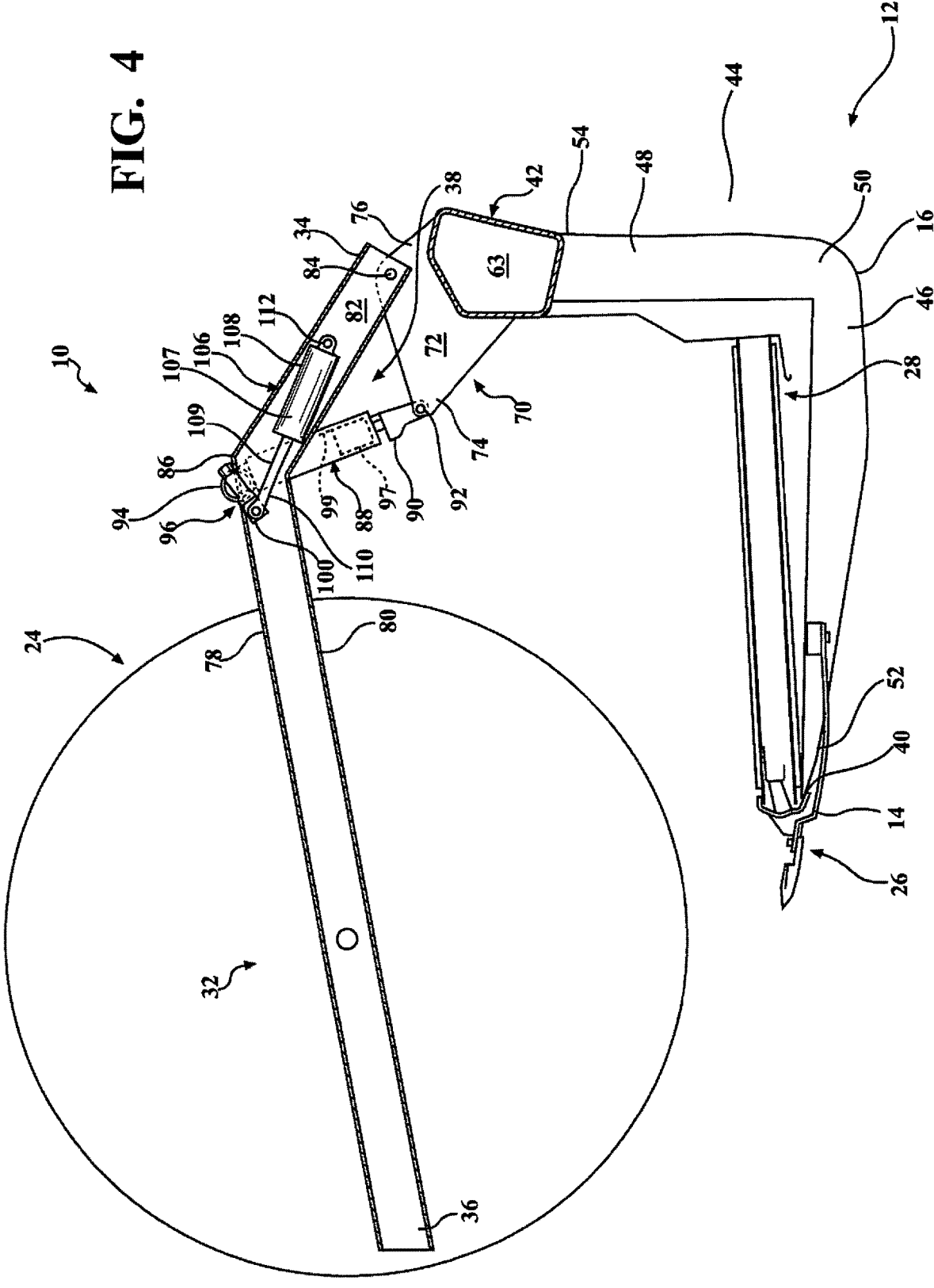
FIG. 4 is a cross-sectional side view of the draper header of FIG. 1.
Figure 5A:
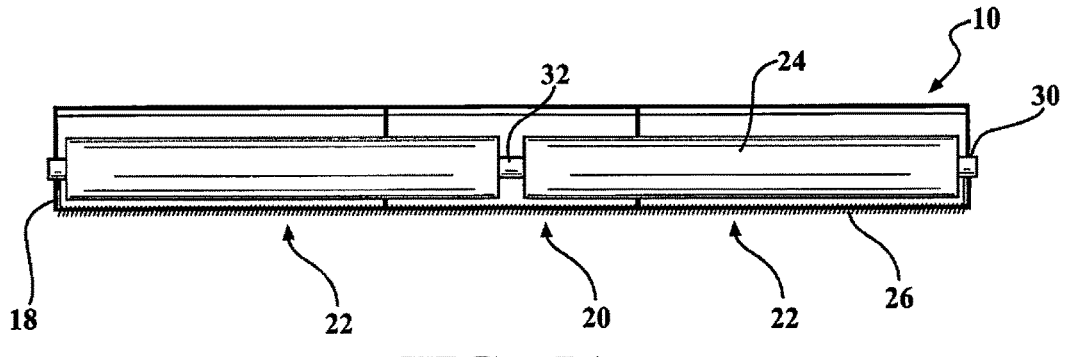
FIG. 5A is a simplified fragmentary front view of the draper header of FIG. 1 showing a pair of crop pick-up reels positioned close to a cutter bar assembly for optimal crop harvesting efficiency.
Figure 5B:
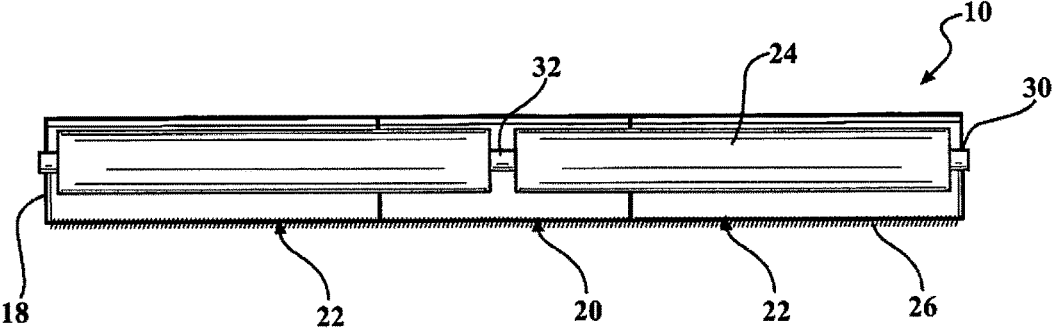
FIG. 5B is a simplified fragmentary front view of the draper header of FIG. 1 showing the pair of crop pick-up reels spaced at least a target distance from the cutter bar assembly.
Figure 5C:
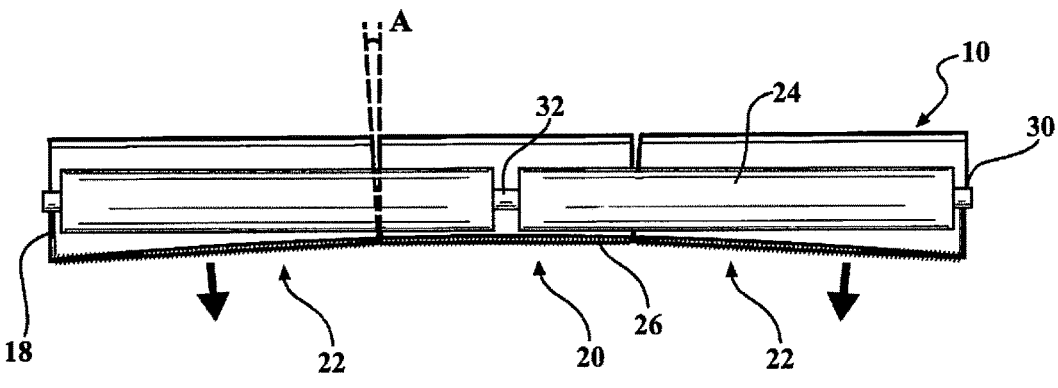
FIG. 5C is a simplified fragmentary front view of the draper header of FIG. 1 showing a pair of side wing sections flexing downwardly relative to a middle frame section past a predetermined maximum pivot angle.
Figure 5D:
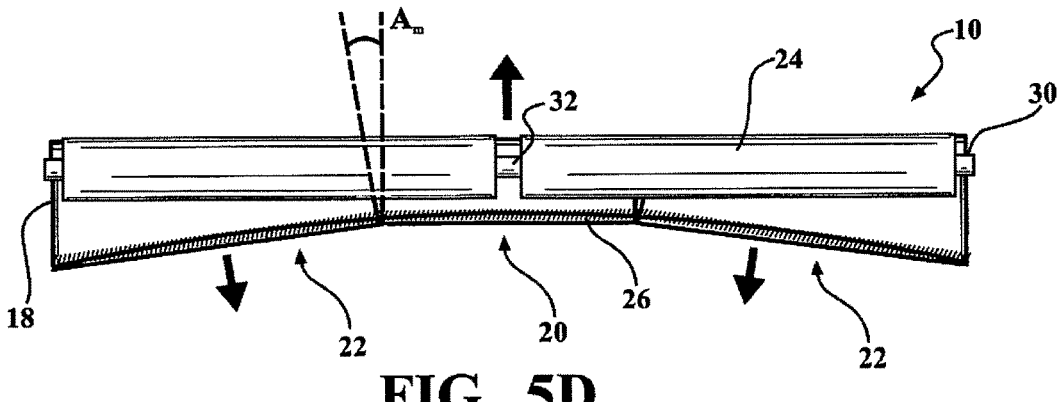
FIG. 5D is a simplified fragmentary front view of the draper header of FIG. 1 showing the pair of side wing sections flexing downwardly relative to the middle frame section and a hydraulic system raising the pair of crop pick-up reels for preventing contact with the cutter bar assembly.

Referring to FIGS. 1,4, and 5A-5D, a pair of crop pick-up reels 24 are positioned generally above the front portion 14 of the header frame 12 for engaging the crops to be harvested. A cutter bar assembly 26 operatively extends across the front portion 14 of the header frame 12 between the ends 18 thereof for cutting the crops to be harvested. During harvesting, the crop pick-up reels 24 are typically positioned as close to the cutter bar assembly 26 as is possible without contacting the cutter bar assembly 26, as shown in FIG. 5A, to facilitate optimal harvesting efficiency of the draper header 10. Referring to FIGS. 5C and 5D, the cutter bar assembly 26 is correspondingly flexible with the side wing sections 22 of the header frame 12 for contouring to the field. One such cutter bar assembly 26 that is flexible with the header frame 12 is described in U.S. Pat. No. 10,462,968, the disclosure of which is hereby incorporated by reference in its entirety. Referring again to FIGS. 1 and 4, the draper header 10 further includes a draper belt assembly, shown generally at 28, rotatably supported by the header frame 12 for transporting the cut crops from the draper header 10 to the agricultural machine, generally for further processing by the combine or for creation of windrows by the swather.

Referring to FIGS. 1 and 2, the draper header 10 includes an outer reel support arm 30 disposed adjacent to each end 18 of the header frame 12 and a center reel support arm 32 spaced generally equidistant therebetween for supporting the crop pick-up reels 24. The outer and center reel support arms 30, 32 each extend between a proximal end 34 operatively coupled to the rear portion 16 of the header frame 12 and an opposite distal end 36 spaced above the front portion 14 of the header frame 12. Each crop pick-up reel 24 is rotatably and slidably coupled between the center reel support arm 32 and one of the outer reel support arms 30. The outer and center reel support arms 30, 32 are pivotable upwardly and downwardly via a hydraulic system, shown generally at 38 and described in further detail below, to vertically position the crop pick-up reels 24 relative to the cutter bar assembly 26. The crop pick-up reels 24 are also slidably moveable along the outer and center reel support arms 30, 32 in a fore direction and in an opposite aft direction between the proximal and distal ends 34, 36 thereof via the hydraulic system 38 for optimally engaging the crops, as is known in the art. It is to be appreciated that the draper header 10 may ultimately include any number or arrangement of reel support arms 30, 32 and crop pick-up reels 24 to correspond to the number of sections on the header frame 12 without varying the scope of the invention. For example, FIG. 3 shows the alternate embodiment of the draper header 10', which includes only a pair of side wing sections 22' and a single crop pick-up reel 24' rotatably coupled between a pair of outer reel support arms 30' positioned adjacent to opposite ends 18' of the header frame 12'.

Referring to FIGS. 2 and 4, the header frame 12 includes a front support beam 40 extending laterally across the front portion 14 of the header frame 12 between the ends 18 thereof and a discontinuous rear support beam 42 extending laterally across the rear portion 16 of the header frame 12 between the ends 18 thereof. Each side wing section 22 of the header frame 12 is pivotally and operatively coupled to the middle frame section 20 between a pair of laterally spaced-apart and generally L-shaped support legs 44 extending between the front and rear portions 14, 16 of the header frame 12. Each support leg 44 includes a horizontal portion 46 and a vertical portion 48 intersecting at a substantially right angle 50 adjacent to the rear portion 16 of the header frame 12, as shown in FIGS. 2 and 4. The horizontal portion 46 of each support leg 44 extends between the right angle 50 and a first end 52 fixedly coupled to the front support beam 40. The vertical portion 48 of each support leg 44 extends between the right angle 50 and a second end 54 fixedly coupled to the rear support beam 42.

Figure 6:
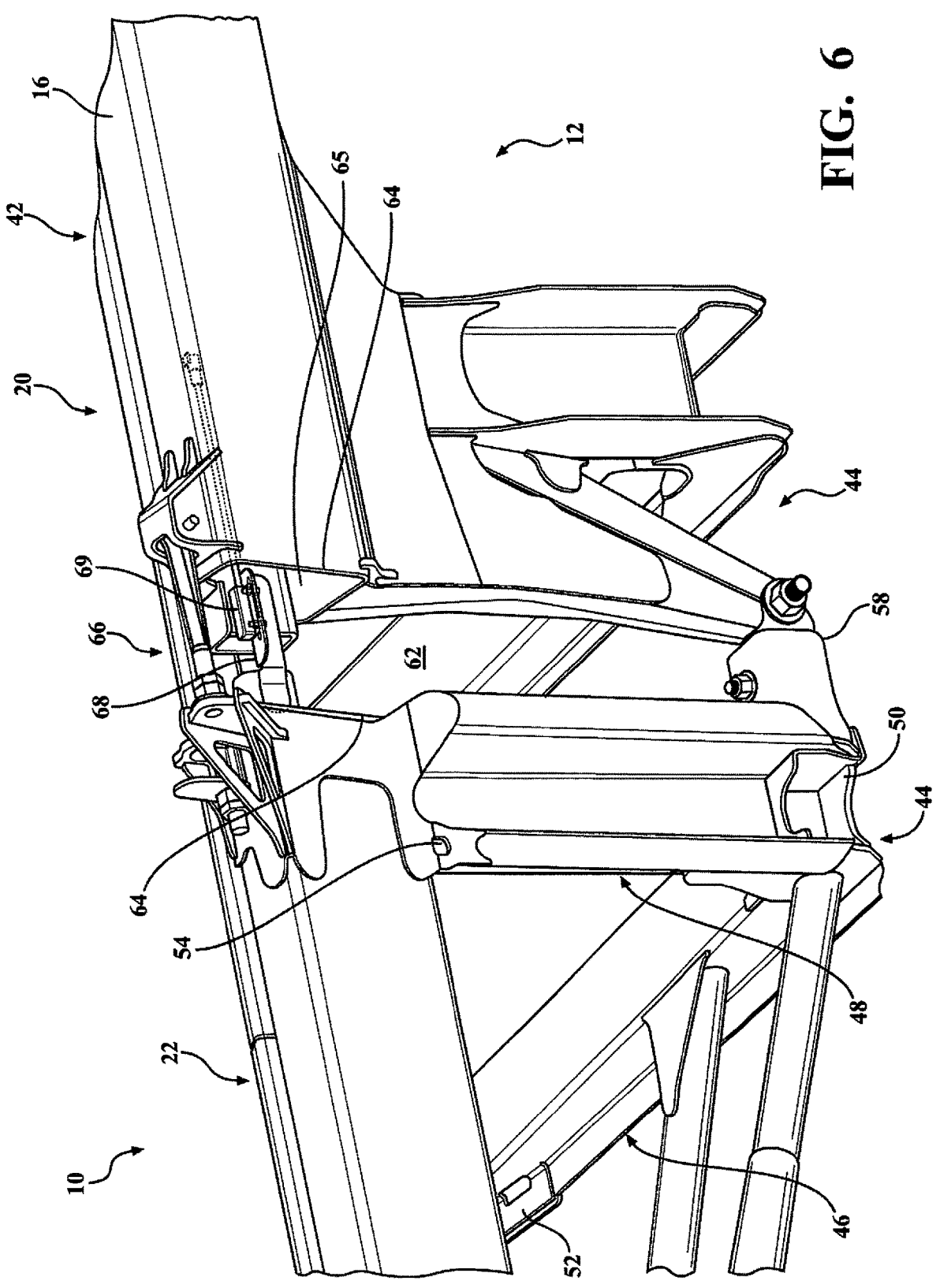
FIG. 6 is an enlarged fragmentary rear perspective view of the draper header of FIG. 1 showing a wing sensing system.

A first wing pivot 58 is coupled between the right angles 50 of each respective pair of support legs 44, as shown in FIGS. 2 and 6, and a second wing pivot 60 is coupled between the first ends 52 of each respective pair of support legs 44, as shown in FIG. 2. The first and second wing pivots 58, 60 allow the side wing sections 22 to pivot upwardly and downwardly relative to the middle frame section 20 to contour to the field, as is known in the art and as is shown in FIGS. 5C and 5D. Referring to FIG. 2, the draper header 10 may additionally include a plurality of similar L-shaped auxiliary support legs 56 extending between the front support beam 40 and the rear support beam 42 in a similar manner for further stability and support of the header frame 12 and for coupling with additional components of the draper header 10, such as a transport system or a gauge wheel system. Therefore, it is to be appreciated that the draper header 10 may include any suitable number of support legs 44 and auxiliary support legs 56 without varying the scope of the invention.

Referring to FIGS. 2A and 6, a series of gaps 62 bisect the rear support beam 42 to allow pivoting of the side wing sections 22 relative to the middle frame section 20. Each gap 62 extends between a pair of inner edges 64 disposed adjacent to the second ends 54 of each pair of support legs 44, as shown in FIG. 6. The rear support beam 42 further includes an interior space 65 extending therethrough. A wing sensing system, shown generally at 66, is mounted at least partially within each gap 62 to sense pivoting of the side wing sections 22 relative to the middle frame section 20. Each wing sensing system 66 includes a wing pivot sensor 69 operatively coupled between the respective side wing section 22 and the middle frame section 20. Referring to FIGS. 5C and 5D, the wing pivot sensors 69 are adapted and arranged for sensing and determining a pivot angle A of each side wing section 22 relative to the middle frame section 20 and signaling when at least one of the side wing sections 22 pivots downwardly past a predetermined maximum pivot angle $A_m$ relative to the middle frame section 20. In one embodiment of the draper header 10, the predetermined maximum pivot angle $A_m$ of the side wing sections 22 is contemplated to be one degree relative to the middle frame section 20. However, the predetermined maximum pivot angle $A_m$ can ultimately vary depending on the overall size and intended use of the draper header 10. Additionally, it is appreciated that the pivot angle A and the maximum pivot angle $A_m$ can be measured vertically between the middle frame section 20 and the respective side wing section 22, as shown in the Figures, or alternatively, can be measured horizontally between the middle frame section 20 and the respective side wing section 22.

Referring again to FIGS. 2A and 6, a substantially planar platform 68 extends from one of each pair of inner edges 64 into the gaps 62 of the rear support beam 42. Each wing pivot sensor 69 is secured to the respective platform 68 and extends from the platform 68 into the interior space 65 of the rear support beam 42 at the other of the inner edges 64 for determining the pivot angle A. However, it is to be appreciated that any type of wing pivot sensor 69 may be secured to the respective platform 68 or any other suitable location on the draper header 10 to signal pivoting of the side wing sections 22. For example, the wing pivot sensor 69 could be a switch that opens or closes when the side wing sections 22 pivot downwardly relative to the center frame section 20. Alternatively, the wing pivot sensor 69 could be a potentiometer. Additionally, it is contemplated that the wing sensing system 66 may also include the capability to sense a speed at which the side wing sections 22 are pivoting relative to the middle frame section 20.

Figure 9:
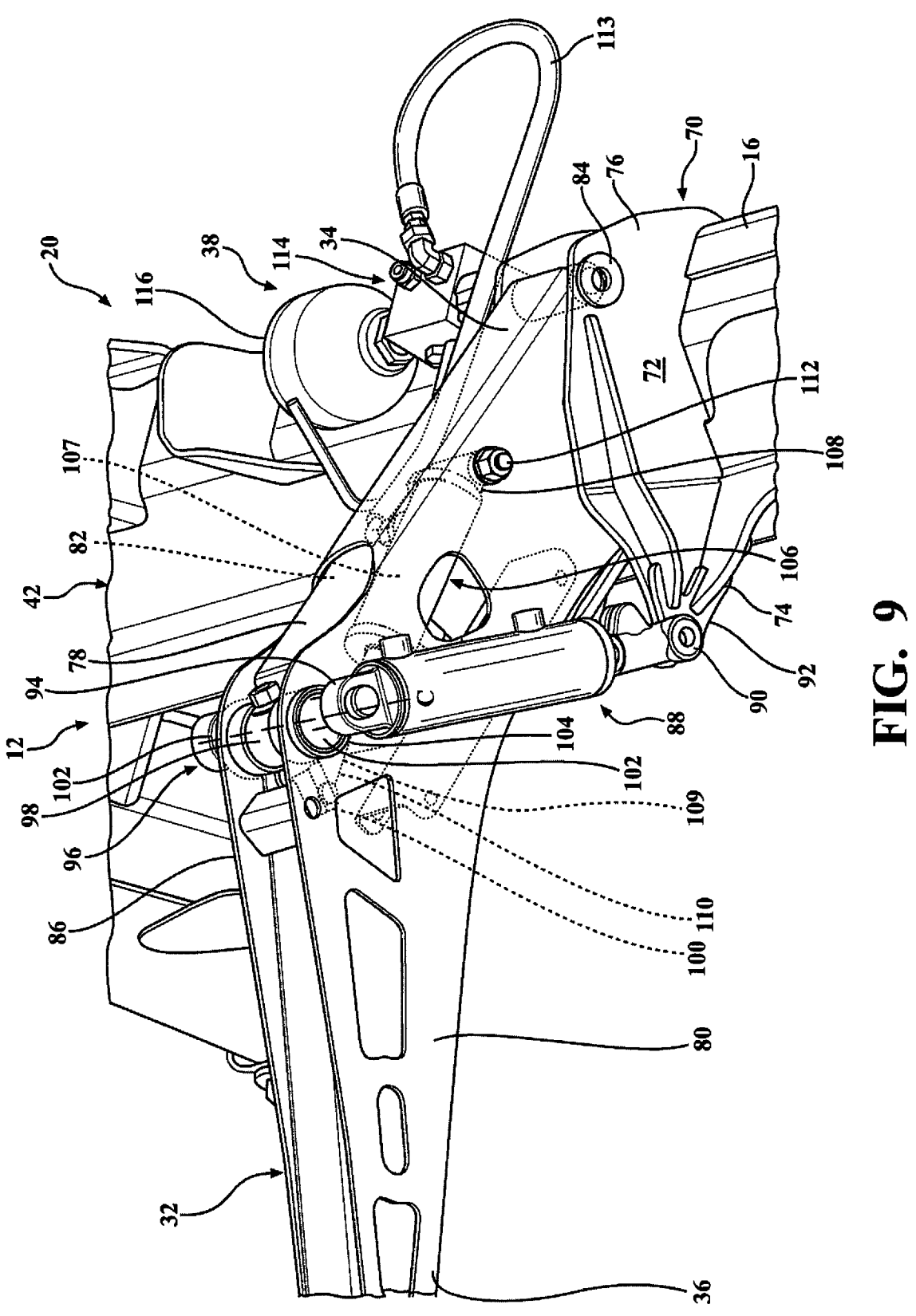
FIG. 9 is a fragmentary perspective view of the draper header of FIG. 1 showing a pair of lift cylinders and a down-stop cylinder operatively coupled to the center reel support arm.

Referring to FIGS. 4 and 7-9, a mounting bracket 70 is secured to the rear support beam 42 approximately equidistant between the ends 18 of the header frame 12 for operatively and pivotally coupling the center reel support arm 32 to the header frame 12. The mounting bracket 70 includes a pair of laterally-spaced apart side walls 72 extending upwardly and forwardly from the rear support beam 42. Each side wall 72 has a front portion 74 and a rear portion 76, as shown in FIGS. 4 and 9. The proximal end 34 of the center reel support arm 32 is pivotally coupled between the side walls 72 of the mounting bracket 70 at a first attachment point 84 disposed adjacent the rear portion 76 thereof. The center support arm 32 extends upwardly and outwardly from the mounting bracket 70 and includes an intermediate angled portion 86 spaced between the proximal and distal ends 34, 36 thereof, as shown in FIG. 4, thereby positioning the crop pick-up reel 24 generally above the front portion 14 of the header frame 12. Referring to FIGS. 4 and 7-9, the center reel support arm 32 also has a horizontal top side 78 extending between a pair of depending outer side walls 80 with an interior space 82 disposed therebetween.

Figure 7:
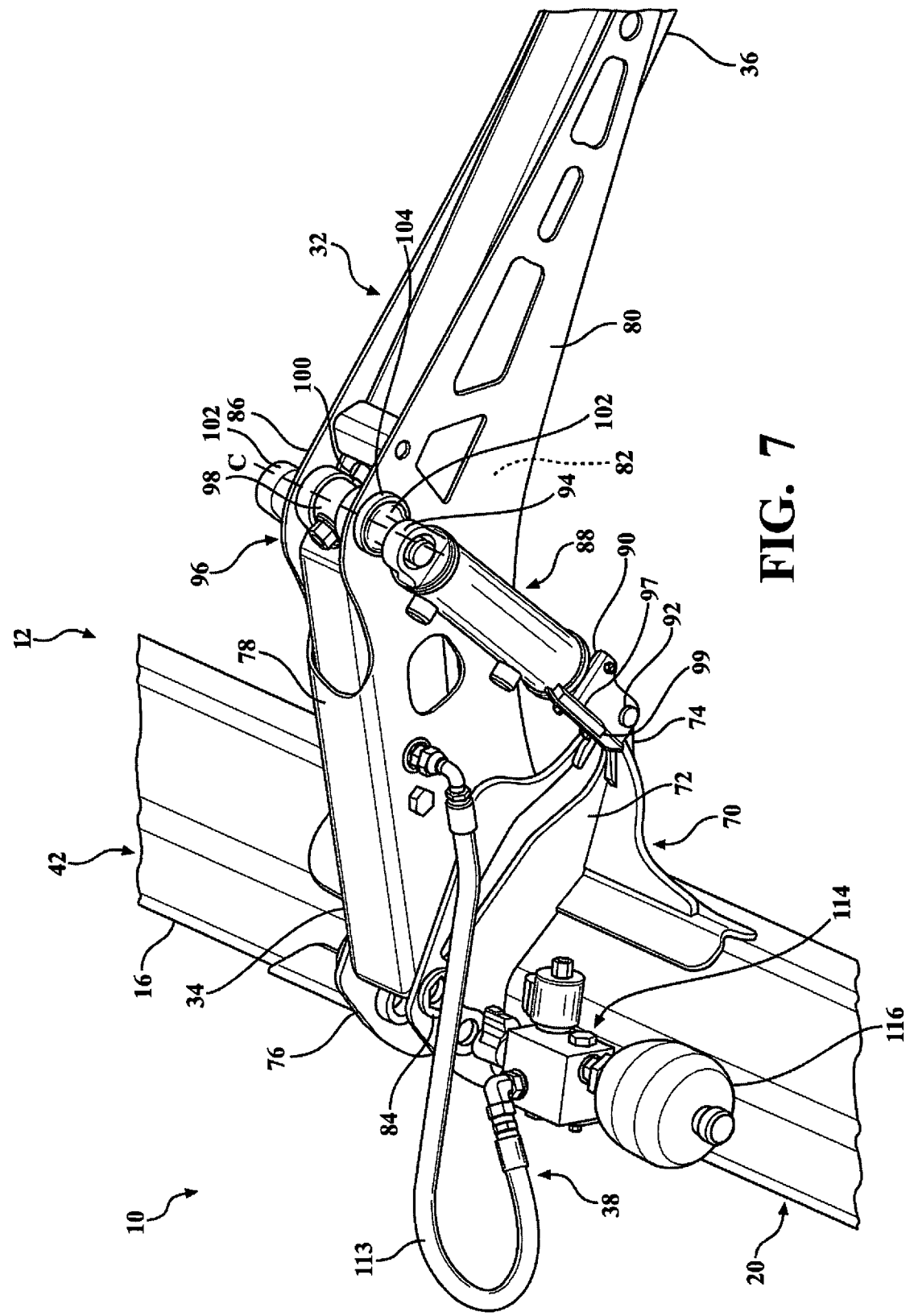
FIG. 7 is a fragmentary perspective view of the draper header of FIG. 1 showing a center reel support arm operatively coupled to a rear beam of the header frame.
Figure 8:
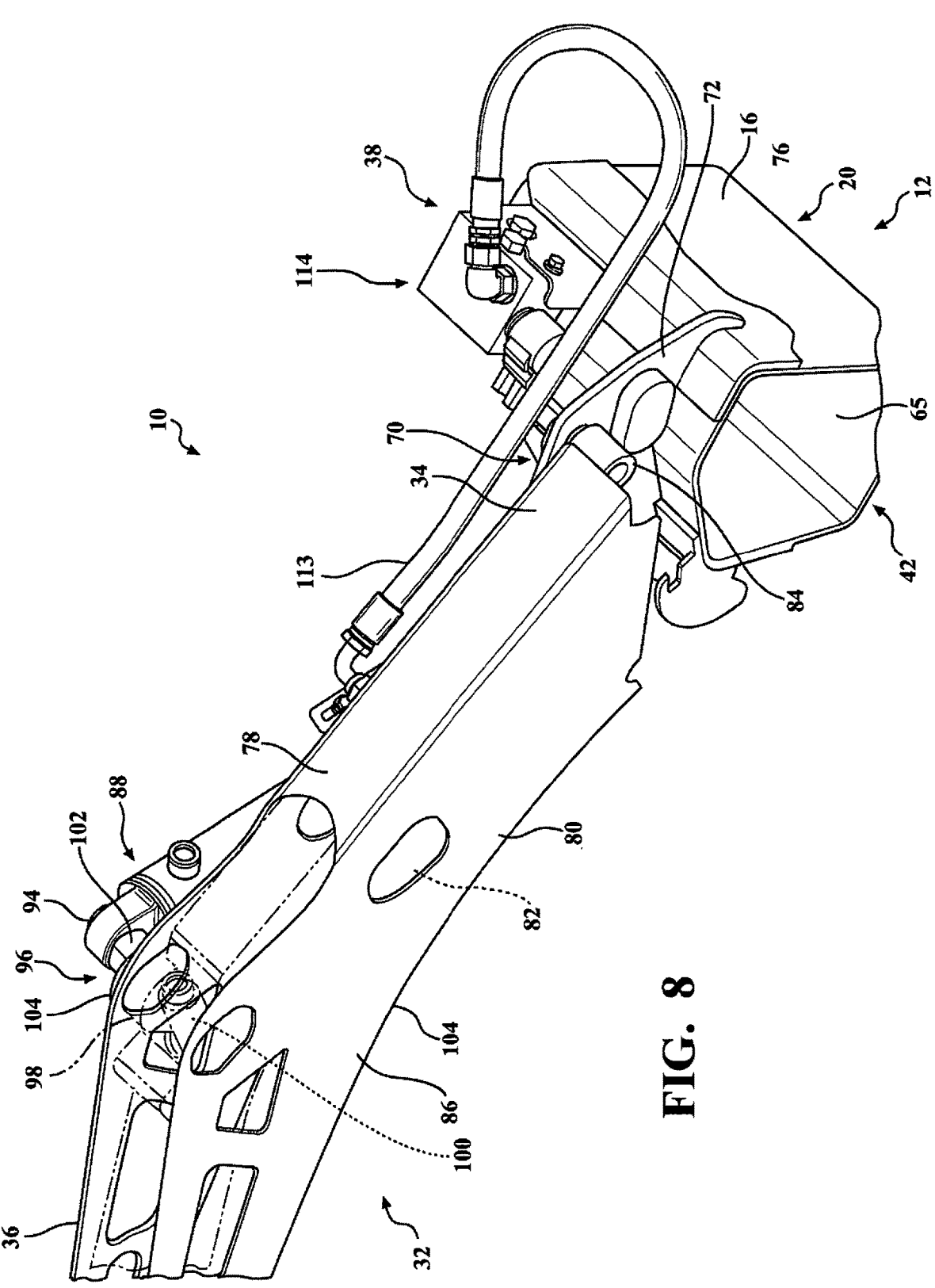
FIG. 8 is a fragmentary perspective view of the draper header of FIG. 1 further showing the center reel support arm operatively coupled to the rear beam of the header frame.

Referring to FIGS. 4, 7, and 9, the hydraulic system 38 includes a pair of lift cylinders 88 flanking the center reel support arm 32 for pivoting the center reel support arm 32 and vertically positioning the crop pick-up reels 24 relative to the cutter bar assembly 26. As discussed above, during typical harvesting operations, the lift cylinders 88 are often used to position the crop pick-up reels 24 as close to the cutter bar assembly 26 as possible without contacting the cutter bar assembly 26 for optimal harvesting efficiency, as shown in FIG. 5A. However, if an operator wants to harvest with the crop pick-up reels 24 spaced farther from the cutter bar assembly 26, the operator can actuate the lift cylinders 88 to change the vertical position of the crop pick-up reels 24 relative to the cutter bar assembly 26, as shown in FIG. 5B. Referring again to FIGS. 4, 7, and 9, each lift cylinder 88 extends between a first end 90 and an opposite second end 94. The first ends 90 of the lift cylinders 88 are operatively coupled to a second attachment point 92 adjacent to the front portion 74 of each respective side wall 72 of the mounting bracket 70, and the second ends 94 of the lift cylinders 88 are operatively coupled to a double pivot mechanism, or crankshaft, shown generally at 96. Referring to FIGS. 4 and 7, a cylinder bracket 99 is also coupled to one of the second attachment points 92 and extends substantially parallel to the respective lift cylinder 88. A reel height position sensor 97 is operatively coupled to the cylinder bracket 99 and is adapted to sense a position of the lift cylinders 88 for determining a corresponding distance of the crop pick-up reels 24 from the cutter bar assembly 26.

Figure 10A:
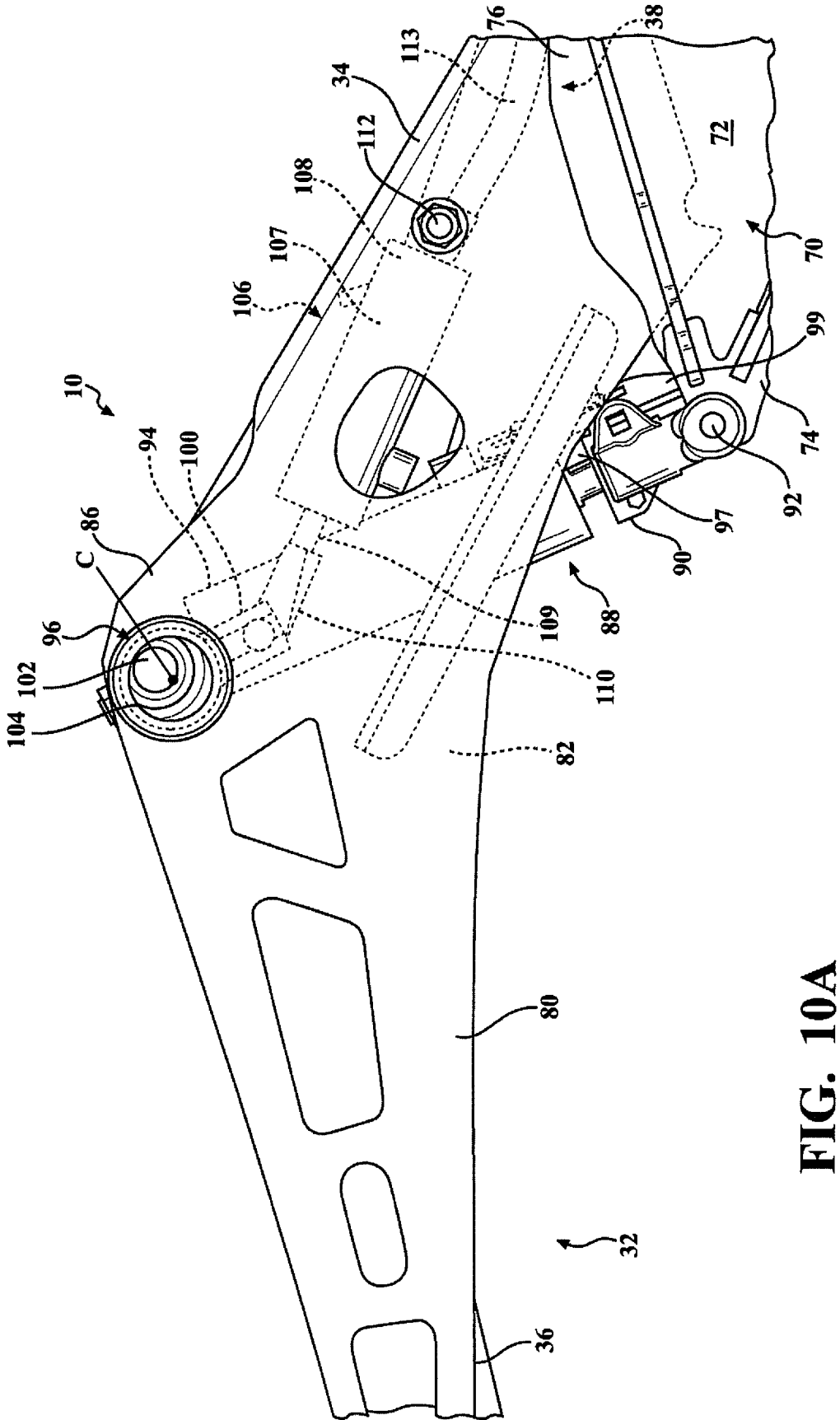
FIG. 10A is an enlarged fragmentary side view of the draper header of FIG. 1 showing the down-stop cylinder operatively coupled to a double pivot mechanism.
Figure 10B:
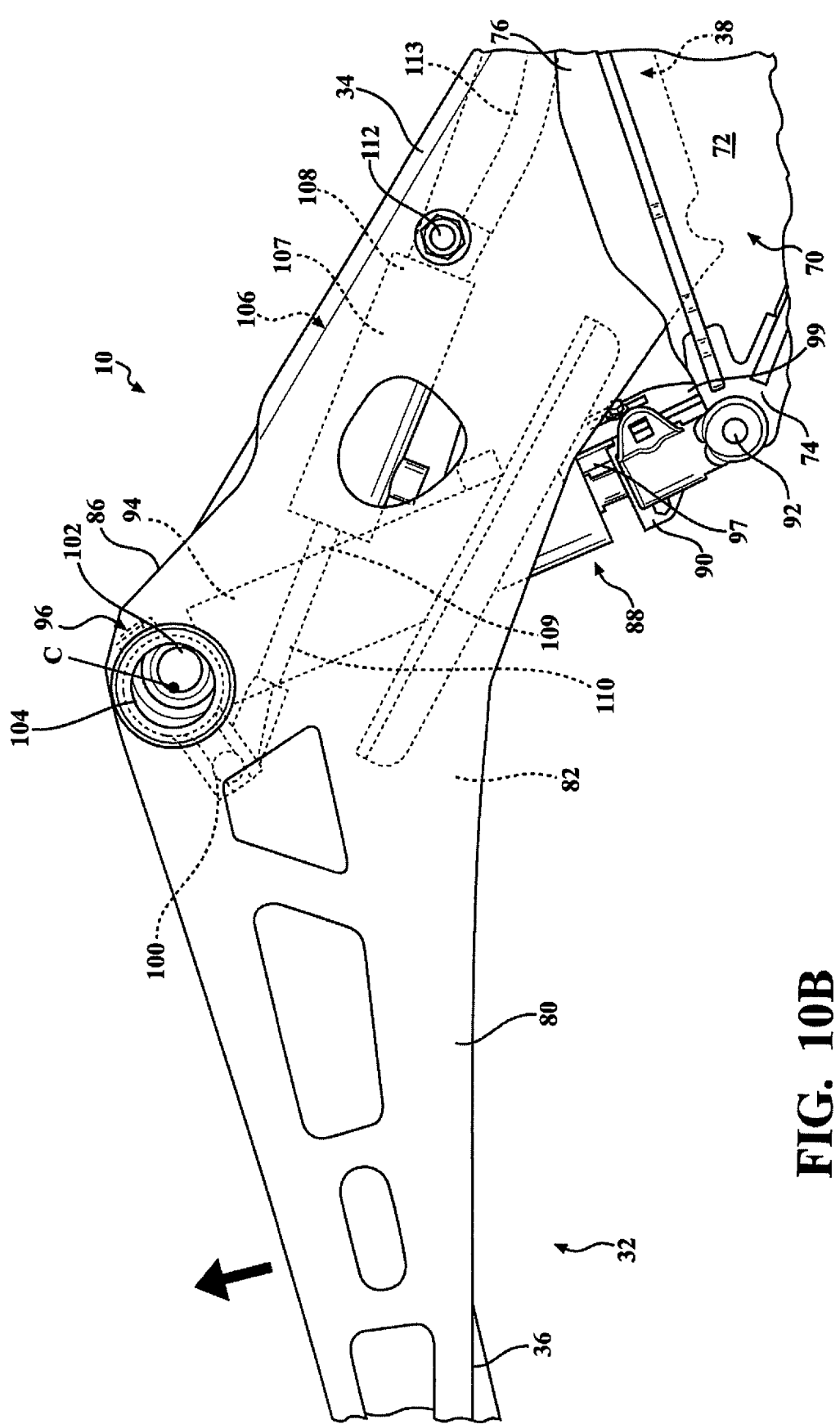
FIG. 10B is an enlarged fragmentary side view of the draper header of FIG. 1 showing the down-stop cylinder extended for rotating the double pivot mechanism in a clockwise direction and raising the pair of crop pick-up reels.

Referring to FIGS. 4, 7, and 9, the double pivot mechanism 96 is positioned within the interior space 82 of the center reel support arm 32 at the intermediate angled portion 86 thereof, and at least a portion of the double pivot mechanism 96 extends through each of the outer side walls 80. The double pivot mechanism 96 is adapted to rotate in a clockwise direction and an opposite counterclockwise direction relative to the center reel support arm 32, as shown in FIGS. 10A and 10B. The double pivot mechanism 96 includes a generally cylindrical center portion 98 extending laterally between the outer side walls 80 of the center reel support arm 32 and defining a central rotational axis C. Additionally, a hydraulic cylinder attachment element 100 extends radially from the center portion 98, and a pair of opposing attachment arms 102 extend laterally from the center portion 98 through corresponding holes 104 in each outer side wall 80 of the center support arm 32 for operatively coupling with the second ends 94 of the lift cylinders 88. Referring to FIGS. 10A and 10B, the attachment arms 102 are positioned eccentric to the central rotational axis C and are constantly engaged with the respective outer side walls 80 through the holes 104 such that the double pivot mechanism 96 acts as an eccentric, similar to eccentric cam lobes on a crankshaft, about the holes 104 during rotation in the clockwise and counterclockwise directions.

Referring to FIGS. 4 and 9-10B, the hydraulic system 38 further includes a quick-activation down-stop cylinder 106, which, in coordination with the double pivot mechanism 96, quickly raises the center reel support arm 32 to prevent the crop pick-up reels 24 from contacting the cutter bar assembly 26 during flexing of the side wing sections 22 of the header frame 12. The down-stop cylinder 106 is mounted within the interior space 82 of the center reel support arm 32 and extends between a first end 108 and an opposite second end 110. The first end 108 of the down-stop cylinder 106 is operatively coupled to a third attachment point 112 within the center reel support arm 32 adjacent to the proximal end 34 thereof. The second end 110 of the down-stop cylinder 106 is pivotally attached to the hydraulic cylinder attachment element 100 of the double pivot mechanism 96. Referring to FIGS. 10A and 10B, extension of the down-stop cylinder 106 rotates the double pivot mechanism 96 in the clockwise direction via the hydraulic cylinder attachment element 100. Rotation of the double pivot mechanism 96 in the clockwise direction correspondingly rotates each of the attachment arms 102 in the clockwise direction about the holes 104 and causes the attachment arms 102 to push radially outward on the side walls 80, thereby quickly raising the center reel support arm 32 and the crop pick-up reels 24 without extending the lift cylinders 88. Alternatively, instead of acting as an eccentric, it is appreciated that the double pivot mechanism 96 could instead be a ball and socket joint for raising the center reel support arm 32 without extending the lift cylinders 88.

As described in further detail below, the wing pivot sensors 69 and the reel height position sensor 97 work in tandem to determine when to actuate the down-stop cylinder 106 to quickly raise the crop pick-up reels 24, thereby preventing the crop pick-up reels 24 from contacting the cutter bar assembly 26. Generally, the down-stop cylinder 106 is automatically actuated to raise the crop pick-up reels 24 when the wing pivot sensor 69 senses that at least one of the side wing sections 22 has pivoted downwardly past the predetermined maximum pivot angle $A_m$ relative to the middle frame section 20, as shown in FIGS. 5C and 5D. However, the hydraulic system 38 is prevented from actuating the down-stop cylinder 106 to raise or lower the crop pick-up reels 24 when the reel height position sensor 97 determines that the crop pick-up reels 24 are spaced a sufficient target distance from the cutter bar assembly 26; for example, as shown in FIG. 5B. When spaced at least the target distance from the cutter bar assembly 26, pivoting of the side wing sections 22 past the predetermined maximum pivot angle $A_m$ will not cause the cutter bar assembly 26 to contact the crop pick-up reels 24. Therefore, when spaced at or above the target distance from the cutter bar assembly 26, the crop pick-up reels 24 will not move via the down-stop cylinder 106 based on the pivot angles A of the side wing sections 22. In one embodiment of the draper header 10, the target distance is contemplated to be approximately 15 cm (6 in). However, it is to be appreciated that the target distance can vary depending on the overall size and intended use of the draper header 10.

Figures 11, 12:
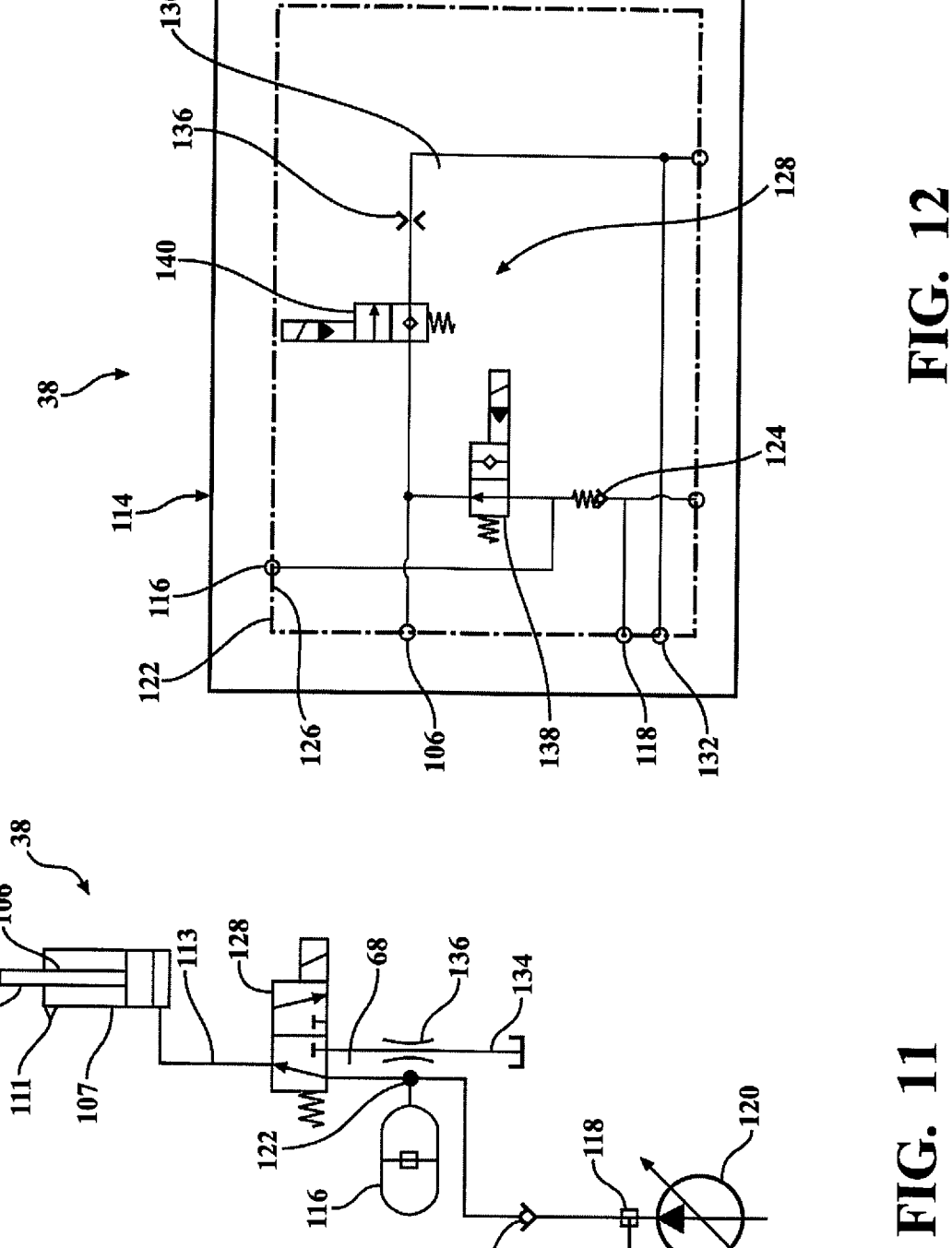
FIG. 11 is a diagrammatic chart showing an operative configuration of a hydraulic system of the draper header of FIG. 1.
FIG. 12 is a preferred configuration of a manifold to perform hydraulic functions of the hydraulic system of the draper header of FIG. 1.

The down-stop cylinder 106 is preferably a hydraulic cylinder that includes a cylinder body 107 and an extendable or telescoping piston rod 109 which is driven by a cylinder piston in a conventional manner to extend the piston rod 109 when pressurized. As will be apparent from the following disclosure, the down-stop cylinder 106 is normally pressurized so that the piston rod 109 is sufficiently extended to vertically space the crop pick-up reels 24 above the cutter bar assembly 26 at least until the side wing sections 22 are level or upwardly pivoted relative to the middle frame section 20. The down-stop cylinder 106 preferably retracts when depressurized to rotate the double pivot mechanism 96 in the counterclockwise direction (when viewed from FIGS. 10A and 10B) to prepare for quick raising of the crop pick-up reels 24. Referring to FIG. 11, the cylinder body 107 includes a vent 111 on a low-pressure side of the cylinder piston to permit the piston rod 109 to extend or retract depending upon whether the high-pressure side of the piston is being pressurized or depressurized. The cylinder body 107 is fed by a pressure hose or a pressure line 113, which can both supply and discharge the hydraulic pressure fluid during operation. Referring to FIGS. 7-9 and 12, the hydraulic system 38 includes a valved manifold 114 that controls the flow of hydraulic fluid through the pressure line 113 and thereby controls operation of the down-stop cylinder 106. The hydraulic system 38 also includes a pressurized accumulator 116 that can quickly supply pressurized fluid back to the down-stop cylinder 106 to repressurize and extend the down-stop cylinder 106 as discussed further herein.

The hydraulic system 38 is described in more detail relative to FIGS. 11 and 12. The manifold 114 includes an inlet port 118 which serves to supply pressure fluid into the manifold 114. In a preferred system, shown in FIG. 11, the pressure is supplied by a draper circuit pump 120 that serves as a pressure source and supplies fluid to the draper supply line 115, which supplies pressurized hydraulic fluid to the side wing sections 22. However, it is to be appreciated that other pressure sources may be used to supply pressurized hydraulic fluid to the side wing sections 22 without varying the scope of the invention. The manifold 114 further includes an accumulator port 122 which connects to and supports the accumulator 116. The inlet port 118 supplies the pressure fluid to the accumulator 116 to pressurize a stored volume of pressure fluid therein for subsequent use in repressurizing the down-stop cylinder 106. A check valve 124 is provided to prevent backflow of the pressure fluid out of the inlet port 118. The down-stop cylinder 106 connects to the manifold 114 by the pressure line 113, which further connects to a cylinder port 126 on the manifold 114.

Upstream of the accumulator 116, a valve configuration 128 is provided to generally control the flow of pressure fluid to and from the down-stop cylinder 106. On an inlet side, the valve configuration 128 is in operative fluid connection with the inlet port 118. Generally, to discharge pressure fluid and to depressurize the down-stop cylinder 106, the valve configuration 128 has a drain side operatively and fluidly connected to a case drain line 130 and a drain port 132, which in turn discharge the pressure fluid into a tank line or a case drain line 134, as shown in FIG. 11. The case drain line 134 also has a restricted discharge flow, which may be governed by a removable orifice 136, as shown in FIGS. 11 and 12.

In further detail, the valve configuration 128 is generally illustrated in FIG. 11 as a 3/2-way valve that is normally open to supply pressure fluid to the down-stop cylinder 106, which can be quickly fed by the stored volume of pressure fluid in the accumulator 116 or more slowly fed by the draper circuit pump 120 or other pressure source. During normal operation, the draper circuit pump 120 supplies pressure to the accumulator 116 to build up the stored volume, and the pressure fluid is also fed to and extends the down-stop cylinder 106. The valve configuration 128, however, is normally closed to the drain side to prevent discharge of the pressure fluid to the case drain line 130. To retract the down-stop cylinder 106, the valve configuration 128 can close the inlet side and open the drain or outlet side so that pressure fluid in the down-stop cylinder 106 can now drain through the orifice 136 and the drain port 132. However, during operation, it may be necessary to quickly raise the crop pick-up reels 24, wherein the valve configuration 128 is operated to close the drain side and open the inlet side. This results in a quick release of pressure fluid from the accumulator 116 to quickly repressurize the down-stop cylinder 106 for extending the piston rod 109 and raising the crop pick-up reels 24. Once repressurized, the inlet flow can continue to be supplied more slowly by the draper circuit pump 120 to again repressurize the accumulator 116 for subsequent use.

Referring to FIG. 12, the valve configuration 128 can effectively be configured through an inlet valve 138 and an outlet valve 140, which preferably are configured to perform the function of the 3/2-way valve configuration shown in FIG. 11. In more detail, the inlet valve 138 is preferably configured as a normally open single solenoid valve that is actuatable to a closed condition. The outlet valve 140 is preferably configured as a normally closed single solenoid valve that is actuatable to an open condition. Therefore, in the first operative condition, the inlet valve 138 is open to supply pressure fluid to the down-stop cylinder 106, and the outlet valve 140 is closed to prevent outflow of pressure fluid to the case drain line 130. To retract the down-stop cylinder 106, the valves 138, 140 can be actuated to the respective closed and opened conditions, which stops inflow and permits a controlled outflow of pressure fluid to the case drain line 130 to depressurize the down-stop cylinder 106 for retracting the piston rod 109 and lowering the crop pick-up reels 24. However, as noted above, the down-stop cylinder 106 can be quickly repressurized and extended by opening the inlet valve 138 and closing the outlet valve 140 so that the pressure fluid can be quickly fed from the accumulator 116 to the down-stop cylinder 106 for extension thereof.

Generally, in operation, the crop pick-up reels 24 begin vertically spaced above the cutter bar assembly 26 with the lift cylinders 88 and the down-stop cylinder 106 extended. When the wing pivot sensors 69 determine that the side wing sections 22 are level or upwardly pivoted relative to the middle frame section 20, the manifold 114 discontinues pressurized inflow of hydraulic fluid to the down-stop cylinder 106 to permit a controlled release or discharge of pressure fluid. The piston rod 109 of the down-stop cylinder 106 is retracted to rotate the double pivot mechanism 96 in the counterclockwise direction (when viewed from FIGS. 10A and 10B), thereby correspondingly rotating each of the attachment arms 102 in the counterclockwise direction about the holes 104 for lowering the center reel support arm 32 and readying the down-stop cylinder 106 for quickly raising the crop pick-up reels 24. Furthermore, the lift cylinders 88 can be actuated by the operator to position the crop pick-up reels 24 close to the cutter bar assembly 26 for optimal harvesting efficiency, as shown in FIG. 5A.

When the wing pivot sensors 69 sense that at least one of the side wing sections 22 has pivoted downwardly past the predetermined maximum pivot angle $A_m$ and the reel height position sensor 97 senses that the crop pick-up reels 24 are not spaced at or above the target distance from the cutter bar assembly 26, as shown in FIG. 5C, the manifold 114 stops the pressure fluid discharge and quickly repressurizes the down-stop cylinder 106 through inflow of pressure fluid supplied by the accumulator 116. Referring to FIGS. 10A and 10B, repressurization of the down-stop cylinder 106 quickly extends the piston rod 109 to rotate the double pivot mechanism 96 in the clockwise direction. Rotation of the double pivot mechanism 96 in the clockwise direction correspondingly rotates each of the attachment arms 102 in the clockwise direction about the holes 104 and causes the attachment arms 102 to push radially outward on the side walls 80 to upwardly pivot the center reel support arm 32 and lift the crop pick-up reels 24, as shown in FIGS. 5D, thereby avoiding contact of the crop pick-up reels 24 with the cutter bar assembly 26 as it flexes with the side wing sections 22. However, when the wing pivot sensors 69 sense that at least one of the side wing sections 22 has pivoted downwardly past the predetermined maximum pivot angle $A_m$ but the reel height position sensor 97 senses that the crop pick-up reels 24 are spaced at or above the target distance from the cutter bar assembly 26, for example, as shown in FIG. 5B, the manifold 114 will not repressurize the down-stop cylinder 106, and the piston rod 109 will not extend.

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

What is claimed is:

1. A draper header for use in a field to harvest agricultural crops, the draper header comprising:

a header frame with a front portion and a rear portion each extending laterally between opposite ends thereof, the header frame divided into a plurality of header frame sections pivotable upwardly and downwardly relative to each other for contouring to the field;

a cutter bar assembly extending across the front portion of the header frame and flexible with the plurality of header frame sections for cutting the crops to be harvested;

a plurality of reel support arms pivotally coupled to the rear portion of the header frame and extending generally above the front portion of the header frame;

at least one crop pick-up reel rotatably supported by the plurality of reel support arms and positioned generally above the cutter bar assembly for engaging the crops to be harvested;

a reel height position sensor for determining a distance between the at least one crop pick-up reel and the cutter bar assembly;

a wing sensing system operatively coupled to the header frame for sensing pivoting of the plurality of header frame sections relative to each other; and a hydraulic system adapted for raising and lowering the plurality of reel support arms, wherein the hydraulic system is actuated to raise the at least one crop pick-up reel when the wing sensing system detects that one of the plurality of header frame sections pivots downwardly relative to another of the plurality of header frame sections for preventing contact of the at least one crop pick-up reel with the cutter bar assembly;

wherein the wing sensing system detects a pivot angle of each of the plurality of header frame sections relative to the other of the plurality of header frame sections, and wherein the hydraulic system is actuated to raise the at least one crop pick-up reel when the wing sensing system detects that one of the plurality of header frame sections pivots downwardly past a predetermined maximum pivot angle relative to another of the plurality header frame sections; and wherein the hydraulic system is prevented from raising and lowering the at least one crop pick-up reel in response to pivoting of the plurality of header frame sections past the predetermined maximum pivot angle when the distance between the at least one crop pick-up reel and the cutter bar assembly is at least a predetermined minimum distance in which the cutter bar assembly can flex with the plurality of header frame sections without contacting the at least one crop pick-up reel.

2. The draper header of claim 1 wherein the hydraulic system includes a down-stop cylinder for raising the at least one crop pick-up reel in response to pivoting of the plurality of header frame sections past the predetermined maximum pivot angle.

3. The draper header of claim 2 wherein the hydraulic system further includes at least one lift cylinder for selectively positioning the at least one crop pick-up reel relative to the cutter bar assembly.

4. The draper header of claim 3 further comprising a double pivot mechanism integrated with one of the plurality of reel support arms, wherein the down-stop cylinder and the at least one lift cylinder are each operatively coupled to the double pivot mechanism.

5. The draper header of claim 4 wherein the plurality of header frame sections includes a middle frame section pivotally coupled between a pair of side wing sections, the side wing sections adapted to pivot upwardly and downwardly relative to the middle frame section.

6. The draper header of claim 5 wherein the plurality of reel support arms includes an outer reel support arm disposed adjacent to each of the opposite ends of the header frame and a center reel support arm spaced generally equidistant therebetween.

7. The draper header of claim 6 wherein the at least one crop pick-up reel includes a pair of crop pick-up reels, and each of the pair of crop pick-up reel is rotatably supported by one of the outer reel support arms and the center reel support arm.

8. The draper header of claim 7 wherein the center reel support arm further includes a pair of side walls with an interior space disposed therebetween, and the double pivot mechanism is positioned at least partially within the interior space of the center reel support arm and adapted therein for rotation relative thereto.

9. The draper header of claim 8 wherein the double pivot mechanism includes a center portion extending between the side walls of the center reel support arm, the center portion defining a central rotational axis.

10. The draper header of claim 9 wherein the double pivot mechanism further includes a cylinder attachment element extending radially from the center portion for operatively coupling with the down-stop cylinder.

11. The draper header of claim 10 wherein extension of the down-stop cylinder is adapted to rotate the double pivot mechanism relative to the center reel support arm via the cylinder attachment element.

12. The draper header of claim 11 wherein each of the pair of side walls of the center reel support arm defines a corresponding hole extending therethrough.

13. The draper header of claim 12 wherein the double pivot mechanism further includes a pair of opposing attachment arms extending from the center portion through the respective hole in each side wall for operatively coupling with the at least one lift cylinder.

14. The draper header of claim 13 wherein each of the opposing attachment arms are positioned eccentric to the central rotational axis of the center portion and adapted for rotation about the respective hole in each side wall for raising the pair of crop pick-up reels in response to extension of the down-stop cylinder.

15. The draper header of claim 14 wherein the wing sensing system includes a sensor operatively coupled between the middle frame section and each of the side wing sections for detecting the pivot angle of each side wing section relative to the middle frame section.

16. The draper header of claim 15 wherein the reel height position sensor is mounted adjacent to the at least one lift cylinder for determining the distance between the at least one crop pick-up reel and the cutter bar assembly.

17. The draper header of claim 16 wherein the predetermined maximum pivot angle is one degree.

18. The draper header of claim 17 wherein the predetermined minimum distance is 15 cm.

19. The draper header of claim 18 further comprising a draper belt assembly rotatably supported by the header frame for transporting crops from the draper header.

20. The draper header of claim 4 wherein the plurality of header frame sections includes first and second side wing sections, the first and second side wing sections adapted to pivot upwardly and downwardly relative to each other.

21. The draper header of claim 20 wherein the plurality of reel support arms includes a pair of lateral reel support arms, and each lateral reel support arm is disposed adjacent to one of the opposite ends of the header frame.

22. The draper header of claim 21 wherein the at least one crop pick-up reel includes a single crop pick-up reel rotatably supported between the lateral reel support arms.

* * * * *